United States Patent Office 2,922,741
Patented Jan. 26, 1960

2,922,741
COMPOSITIONS FOR COMBATING NEMATODES

Ewald Urbschat, Koln-Mulheim, and Bernhard Homeyer, Koln-Stammheim, Germany, assignors to Farbenfabriken Bayer Aktiengesellschaft, Leverkusen, Germany, a corporation of Germany No Drawing. Application December 5, 1956
Serial No. 626,307

Claims priority, application Germany December 9, 1955

6 Claims. (Cl. 167—30)

The present invention relates to a method for the combating of nematodes as well as to nematocidal compositions containing as active ingredients compounds of the following formula

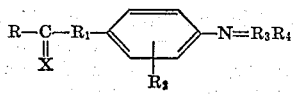

in which R stands for an amino or hydroxygroup which may furthermore be substituted by aliphatic or aromatic radicals or for the radical of aliphatic or aromatic hydrocarbons, X may be O, S or NH (instead of C=X also the $SO_2$ group may be convenient) $R_1$ may be azo and hydrazo radicals, $R_2$ stands for a phenyl substituent such as alkyl, alkoxy, halogen or nitro and $R_3$ and $R_4$ each being hydrogen or $R_3+R_4$ being oxygen.

Nematodes infecting the soil have previously been combated by a number of processes which, however, suffer from various disadvantages. To omit for some years cultivating plants which are especially predisposed to attacks by nematodes is unsatisfactorily. Disinfection of the soil by treatment with gaseous nematocides is costly and, however, restricted to relatively small areas of soil. The efficiency of chemical compositions heretofore proposed for combating nematodes by incorporating them into the soil is also often limited. Besides, most of the hitherto known chemical compositions cause damage to plants and are difficult and hazardous to handle.

In accordance with the present invention it has now been found that certain derivates of quinone oxime semicarbazone which correspond to the following formula

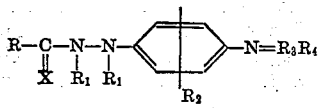

can be used with advantage to combat nematodes. The foresaid compounds which are known in principle and which can be prepared in simple manner by known methods is distinguished by an outstanding effect in killing nematodes. Besides, these compounds of the invention are odorless, show a low volatility and low toxicity to plants and mammals.

It has further been found that particularly the reduction and oxidation products of the quinone oxime semicarbazone, namely the amino phenyl carbamic acid hydrazone of the formula

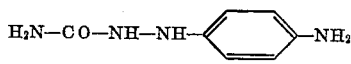

(or its derivatives substituted as mentioned above such as the corresponding thiocarbonic acid hydrazone or guanyl-hydrazone as well as such compounds which bear in the phenyl radical lower alkyl substituents such as the methyl- or ethylgroup or halogen such as chlorine or bromine or a nitrogroup), the amino carbonic acid-azo-p-aminobenzene of the formula

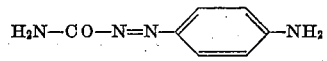

(or its derivatives substituted as mentioned above such as the corresponding thiocarbonic acid hydrazone or guanyl-hydrazone as well as such compounds which bear in the phenyl radical lower alkyl substituents such as the methyl- or ethylgroup or halogen such as chlorine or bromine or a nitrogroup), and the amino carbonic acid-azo-p-nitrosobenzene of the following formula

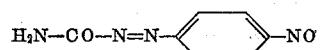

(or its derivatives substituted as mentioned in the first formula such as the corresponding thiocarbonic acid hydrazone or guanyl-hydrazone as well as such compounds which bear in the phenyl radical lower alkyl substituents such as the methyl- or ethylgroup or halogen such as chlorine or bromine or a nitrogroup) have excellent nematocidal activity.

This last mentioned class of compounds may be obtained by oxidation of quinoneoxime semicarbazones with chromic or nitric acid. The compound of the foresaid formula for instance may be obtained from 30 g. quinoneoxime semicarbazone in 50 ml. water and treated with 15 g. chromic acid anhydride in 20 ml. water. After reaction of 30 minutes the amino carbonic acid-azo-p-nitrosobenzene is filtered with suction and recrystallised from dimethylformamid/methanol. It melts at 175° C. under decomposition.

Besides the functional derivatives and substitution products of all these compounds may efficiently be used for combating nematodes. Probably the molecular configuration

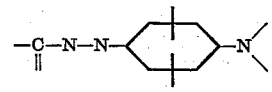

is responsible for the nematocidal properties, since substances wherein the $NH_2$-group is replaced by organic radicals, which may be linked to the C=O group directly or via hetero atoms, show likewise nematocidal activity. The —CO—group also may be replaced by a —CS—, —C=NH— or $SO_2$-group.

The carbamic acid derivatives, which are especially effective nematocides, are incorporated into the soil either as such or in form of their salts preferably after admixing them with inert liquid or solid carriers. Nematodes such as Heterodora schachtii Meloidogyne spec. and the like may effectively be killed. Suitable inert liquid carriers are for instance water (if necessary with commercial emulsifiers), lower aliphatic alcohols such as methanol, ethanol, isopropanol, etc., while chalk, talcum, bentonite, and clay shall be mentioned as examples of solid as carriers.

The active ingredients of the invention can be employed in form of dust, as solutions or emulsions, if desired in combination with suitable dressing agents and/or other active substances having insecticidal or fungicidal activities. It is of special advantage to apply compositions of the compounds of the invention in combination with commercial fertilisers. The compositions according to the present invention may contain the active ingredients in amounts from about 0.01% to about 50%. Preferably solutions, emulsions or solid admixtures containing the nematocidal ingredients up to 10% are used,

Examples

The nematocidal activity of the compounds of the invention was determined by applying them to nematodes of the group meloidogyne spec.

(1) *Laboratory tests.*—The active ingredients were dissolved in water at the concentrations indicated in the following table, and the aqueous compositions obtained were applied to the abovesaid nematodes for 24 hours. The table shows the number of nematodes killed after that time in percentage.

| Conc. | Killing effect | | |
|---|---|---|---|
| | Aminophenylcarbamicacidhydrazone | Aminocarbonic acid-azo-p-aminobenzene | Aminocarbonic acid-azo-p-nitroso benzene |
| Percent | Percent | Percent | Percent |
| 0.1 | 100 | 100 | 100 |
| 0.01 | 100 | 100 | 100 |
| 0.005 | 80 | 90 | 100 |
| 0.001 | 20 | 50 | 80 |

(2) *Greenhouse test.*—The active substances were incorporated into the infected soil in the form of dust or spray compositions containing 10% of active ingredient and 90% of an inert carrier such as talc. Tomatoes were placed in the soil as hosts.

| Quantity of active ingredients in mg. per 1 kg. of soil | Killing effect | | |
|---|---|---|---|
| | Aminophenylcarbamicacidhydrazone | Aminocarbonic acid-azo-p-aminobenzene | Aminocarbonic acid-azo-p-nitrosobenzene |
| | Percent | Percent | Percent |
| 300 mg./kg. soil | 100 | 100 | 100 |
| 200 mg./kg. soil | 100 | 100 | 100 |
| 100 mg./kg. soil | 100 | 100 | 95 |
| 75 mg./kg. soil | 100 | 95 | 90 |
| 50 mg./kg. soil | 95 | 80 | 80 |
| 25 mg./kg. soil | 60 | 40 | 40 |

We claim:

1. A method of combating nematodes which comprises applying to soil infected with nematodes an effective amount of a compound of the following formula

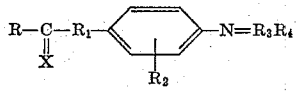

in which R stands for an aminogroup, X stands for a member selected from the group consisting of oxygen, sulfur and an iminogroup, $R_1$ stands for a member selected from the group consisting of azo and hydrazo radicals, $R_2$ stands for a member selected from the group consisting of hydrogen, lower alkyl, chloro, bromo and nitrogroups and $R_3R_4$ stands for a member selected from the group consisting of two hydrogen atoms and one oxygen atom.

2. A nematocidal composition containing as an active ingredient an effective amount of a compound of the formula

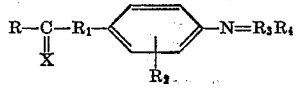

in which R stands for an aminogroup, X stands for a member selected from the group consisting of oxygen, sulfur and an iminogroup, $R_1$ stands for a member selected from the group consisting of azo and hydrazo radicals, $R_2$ stands for a member selected from the group consisting of hydrogen, lower alkyl, chloro, bromo and nitrogroups and $R_3R_4$ stands for a member selected from the group consisting of two hydrogen atoms and one oxygen atom and an inert pesticidal adjuvant as a carrier therefor.

3. A nematocidal composition containing as an active ingredient an effective amount of a compound of the formula

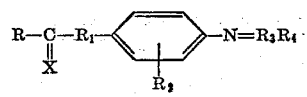

in which R stands for an aminogroup, X stands for a member selected from the group consisting of oxygen, sulfur and an iminogroup, $R_1$ stands for a member selected from the group consisting of azo and hydrazo radicals, $R_2$ stands for a member selected from the group consisting of hydrogen, lower alkyl, chloro, bromo and nitrogroups and $R_3R_4$ stands for a member selected from the group consisting of two hydrogen atoms and one oxygen atom and a commercial fertilizer.

4. A process for combating nematodes which comprises applying to soil infected with nematodes an effective amount of aminophenylcarbamicacidhydrazone.

5. A process for combating nematodes which comprises applying to soil infected with nematodes an effective amount of aminocarbonicacid-azo-p-aminobenzene.

6. A process for combating nematodes which comprises applying to soil infected with nematodes an effective amount of aminocarbonicacid-azo-p-nitrosobenzene.

References Cited in the file of this patent

UNITED STATES PATENTS

| | | |
|---|---|---|
| 1,982,909 | Flint | Dec. 4, 1934 |
| 2,057,044 | Meisenburg | Oct. 13, 1936 |
| 2,261,735 | Gertler | Nov. 4, 1941 |
| 2,335,323 | Tisdale | Nov. 30, 1943 |
| 2,435,204 | Davidson | Feb. 3, 1948 |
| 2,448,265 | Kagy | Aug. 31, 1948 |
| 2,473,984 | Bickerton | June 21, 1949 |
| 2,502,244 | Carter | Mar. 28, 1950 |
| 2,543,580 | Kay | Feb. 27, 1951 |
| 2,779,680 | Wolf | Jan. 29, 1957 |

FOREIGN PATENTS

| | | |
|---|---|---|
| 124,387 | Australia | June 12, 1947 |

OTHER REFERENCES

Frear: Chem. of the Insect., Fung. and Herb. (2nd ed.), September 1948, pp. 64, 286–287, 108–122.

Chem. Abs., 1939, vol. 33, p. 3771 (3).